US010227932B2

(12) United States Patent
Boehm et al.

(10) Patent No.: US 10,227,932 B2
(45) Date of Patent: Mar. 12, 2019

(54) EMISSIONS MODELING FOR GAS TURBINE ENGINES FOR SELECTING AN ACTUAL FUEL SPLIT

(71) Applicant: General Electric Company, Schenectady, NY (US)

(72) Inventors: Randall Boehm, Cincinnati, OH (US); Ruth Donan, Queretaro (MX); Stephen Bartlett, Erlanger, KY (US); Donald Bleasdale, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 15/364,325

(22) Filed: Nov. 30, 2016

(65) Prior Publication Data
US 2018/0149094 A1 May 31, 2018

(51) Int. Cl.
| G05D 11/00 | (2006.01) |
| F02C 9/28 | (2006.01) |
| G05B 13/04 | (2006.01) |
| G05D 7/06 | (2006.01) |
| F02C 7/228 | (2006.01) |
| F23R 3/34 | (2006.01) |

(52) U.S. Cl.
CPC .............. F02C 9/28 (2013.01); F02C 7/228 (2013.01); F23R 3/346 (2013.01); G05B 13/048 (2013.01); G05D 7/0617 (2013.01); F05D 2220/32 (2013.01); F05D 2270/08 (2013.01); F05D 2270/082 (2013.01); F05D 2270/71 (2013.01); F23R 2900/00013 (2013.01); G05B 2219/45076 (2013.01)

(58) Field of Classification Search
CPC .................................................... Y02E 10/723
USPC ......................................................... 700/287
See application file for complete search history.

(56) References Cited

U.S. PATENT DOCUMENTS

| 5,049,063 A |  | 9/1991 | Kishida et al. |
| 5,284,437 A | * | 2/1994 | Aigner ................... F23L 7/002 431/190 |
| 5,319,931 A |  | 6/1994 | Beebe et al. |
| 5,423,175 A |  | 6/1995 | Beebe et al. |
| 5,491,970 A |  | 2/1996 | Davis, Jr. et al. |
| 5,661,969 A |  | 9/1997 | Beebe et al. |
| 6,722,135 B2 |  | 4/2004 | Davis, Jr. et al. |
| 6,810,655 B2 |  | 11/2004 | Davis, Jr. et al. |
| 6,823,253 B2 |  | 11/2004 | Brunell |

(Continued)

FOREIGN PATENT DOCUMENTS

JP        2012207564 A  * 10/2012

*Primary Examiner* — Suresh Suryawanshi
(74) *Attorney, Agent, or Firm* — General Electric Company; Pamela Kachur

(57) ABSTRACT

Systems and methods for regulating fuel at a power plant are provided. One example aspect of the present disclosure is directed to a method for regulating fuel at a power plant. The method includes receiving data from an engine. The engine includes an A-ring, a B-ring, and a C-ring. The method includes updating a plurality of models based on the received data. The method includes predicting a plurality of outputs using the plurality of models for a plurality of fuel splits. Each fuel split includes a fuel amount associated with the A-ring. Each fuel split includes a fuel amount associated with the C-ring. The method includes selecting an actual fuel split based on the plurality of outputs.

19 Claims, 8 Drawing Sheets

(56) References Cited

U.S. PATENT DOCUMENTS

| | | |
|---|---|---|
| 6,823,675 B2 | 11/2004 | Brunell et al. |
| 7,127,898 B2 | 10/2006 | Healy |
| 7,181,916 B2 | 2/2007 | Ziminsky et al. |
| 7,185,494 B2 | 3/2007 | Ziminsky et al. |
| 7,219,040 B2 | 5/2007 | Renou et al. |
| 7,441,398 B2 | 10/2008 | Ziminsky et al. |
| 7,620,461 B2 | 11/2009 | Frederick, II et al. |
| 7,628,062 B2 | 12/2009 | Healy et al. |
| 7,742,904 B2 | 6/2010 | Healy et al. |
| 7,762,084 B2 | 7/2010 | Martis et al. |
| 7,822,512 B2 | 10/2010 | Thatcher et al. |
| 8,019,446 B2 | 9/2011 | Wintrich et al. |
| 8,131,384 B2 | 3/2012 | Karpman et al. |
| 8,145,403 B2 | 3/2012 | Fuller et al. |
| 8,285,468 B2 | 10/2012 | Tonno et al. |
| 8,423,161 B2 | 4/2013 | Wilkes et al. |
| 8,639,480 B2 | 1/2014 | Arnold et al. |
| 8,849,542 B2 | 9/2014 | Meisner et al. |
| 9,043,118 B2 * | 5/2015 | Healy ............... F01D 17/00 123/321 |
| 9,317,249 B2 | 4/2016 | Moeckly et al. |
| 9,328,670 B2 | 5/2016 | Chandler |
| 9,376,983 B2 | 6/2016 | Moeckly et al. |
| 2005/0144955 A1 * | 7/2005 | Handelsman ............ F23N 5/16 60/772 |
| 2005/0193739 A1 | 9/2005 | Brunell et al. |
| 2009/0012762 A1 | 1/2009 | Ellis et al. |
| 2009/0043447 A1 | 2/2009 | Vershinin et al. |
| 2009/0183492 A1 | 7/2009 | Healy et al. |
| 2009/0204453 A1 | 8/2009 | Cooper et al. |
| 2009/0265049 A1 | 10/2009 | Wise et al. |
| 2012/0060505 A1 | 3/2012 | Fuller et al. |
| 2013/0024179 A1 | 1/2013 | Mazzaro et al. |
| 2016/0115839 A1 * | 4/2016 | Abrol ............... F01N 3/208 60/776 |

* cited by examiner

EMISSIONS MODELING FOR GAS TURBINE ENGINES FOR SELECTING AN ACTUAL FUEL SPLIT

FIELD

The present subject matter relates generally to gas turbine engines.

BACKGROUND

Gas turbine engines can be used for a variety of purposes, such as power generation and other purposes. The gas turbine engines can have a combustor. In some cases, combustor can have three rings (A-ring, a B-ring, and a C-ring) arranged radically to permit parallel staging of the three rings. The A-ring can be an outer ring, the B-ring can be a middle ring, and the C-ring can be an inner ring. Fuel provided to the engines can be split between the A-ring, the B-ring, and the C-ring. Power generated by an engine can be determined by the fuel split to the engine. Adjusting the fuel split to the engine can adjust several outputs, including a $NO_x$ output, a CO output, and an acoustics output. An inappropriate fuel split to an engine can cause an undesirable result, such as too much acoustics output.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for regulating fuel at a power plant. The method includes receiving data from an engine. The engine includes an A-ring, a B-ring, and a C-ring. The method includes updating a plurality of models based on the received data. The method includes predicting a plurality of outputs using the plurality of models for a plurality of fuel splits. Each fuel split includes a fuel amount associated with the A-ring. Each fuel split includes a fuel amount associated with the C-ring. The method includes selecting an actual fuel split based on the plurality of outputs.

Another example aspect of the present disclosure is directed to a system for regulating fuel at a power plant. The system includes an engine. The engine includes an A-ring. The engine includes a B-ring. The engine includes a C-ring. The system includes a controller. The controller is configured to receive data from the engine. The controller is configured to update a plurality of models based on the received data. The controller is configured to predict a plurality of outputs using the plurality of models for a plurality of fuel splits. Each fuel split includes a fuel amount associated with the A-ring. Each fuel split includes a fuel amount associated with the C-ring. The controller is configured to select an actual fuel split for the engine based on the plurality of outputs.

Other example aspects of the present disclosure are directed to systems, methods, power plants, devices, non-transitory computer-readable media for regulating fuel at a power plant. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
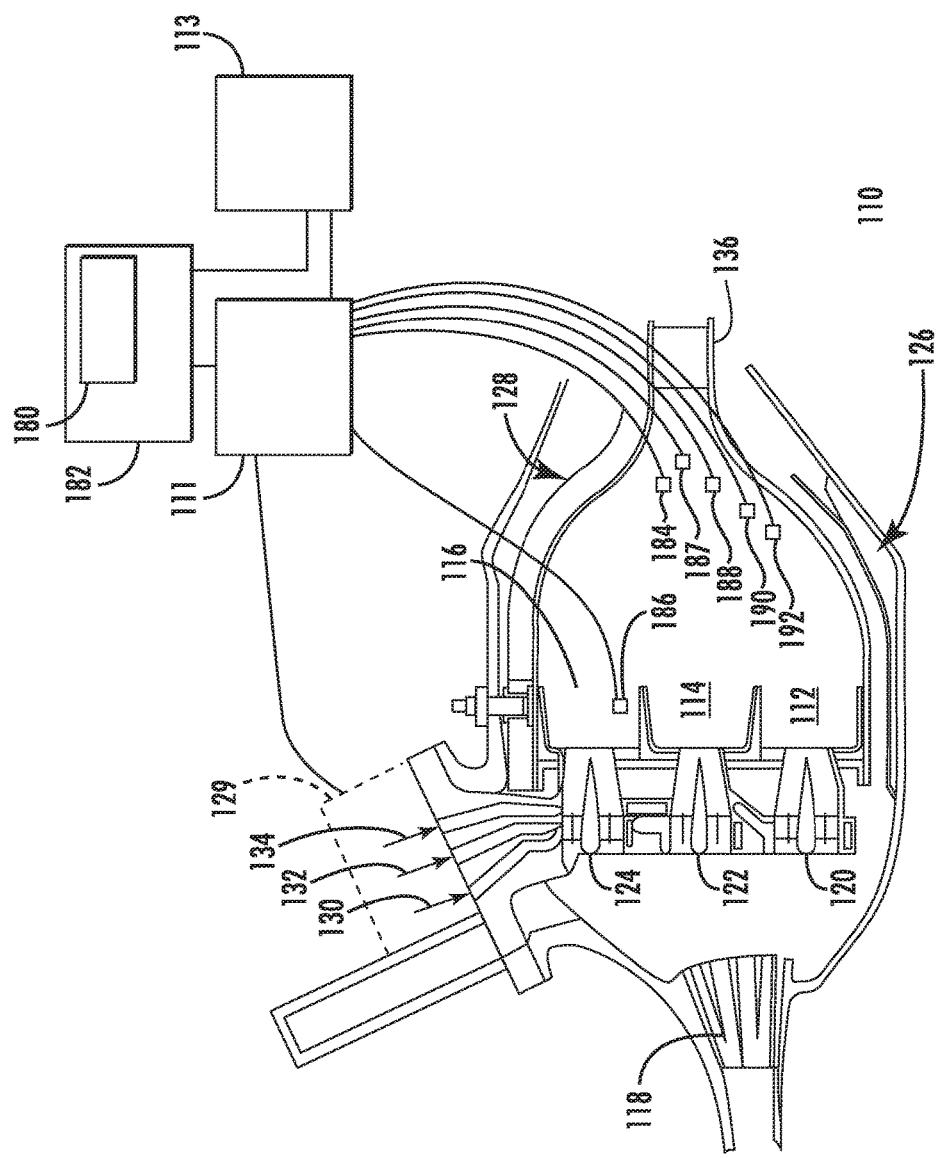
FIG. 1 depicts a cross sectional view of a combustion engine in accordance with one embodiment of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to regulating fuel at a power plant. A power plant can include a plurality of engines. Each engine can include an A-ring, a B-ring, and a C-ring. Fuel provided to an engine can be split between the A-ring of the engine, the B-ring of the engine, and the C-ring of the engine. A controller can control the fuel split of each engine. For example, if a controller specifies a fuel amount provided to the A-ring of an engine and a fuel amount provided to the C-ring of the engine, the remaining fuel provided to the engine can be provided to the B-ring of the engine.

Altering (e.g., adjusting, changing, etc.) the fuel amount provided to the A-ring, the B-ring, and/or the C-ring of an engine can alter outputs from the engine. The outputs can include a $NO_x$ output, a carbon monoxide (CO) output, and an acoustic (PX36) output. A first model can be used to predict a $NO_x$ output for a fuel split. A second model can be used to predict a CO output for the fuel split. A third model can be used to predict an acoustic output for the fuel split.

A determination can be made of whether the modeled fuel split is appropriate based on if the predicted $NO_x$ output is within a desirable $NO_x$ output range, if the predicted CO output is within a desirable CO output range, and/or if the predicted acoustic output is within a desirable acoustic output range. Sensors in the engine can monitor data in the engine. Monitored data in the engine can include flame temperature data (include flame temperature data for the A-ring, the B-ring, and/or the C-ring), pressure inside a combustor of the engine, emissions data, acoustics data, etc. The controller can receive the data from the engine. The controller can update the models based on the data received from the engine.

In this way, the systems and methods according to example aspects of the present disclosure can have a technical effect of tailoring one or more models of fuel splits for a particular engine to better represent the actual conditions of the particular engine.

FIG. 1 shows a cross section of a combustion engine, generally shown as 110, along with a controller 111 and a mapping device 113. The combustor 110 has three rings (C-ring 112, B-ring 114, A-ring 116) arranged radially to permit parallel staging of the three rings (C-ring 112, B-ring 114, A-ring 116). Air enters the combustor 110 via a diffuser 118, where it then passes to a plurality of premixers 120, 122, 124 in the inner, middle and outer rings (C-ring 112, B-ring 114, A-ring 116) and to inner and outer flow baffles 126, 128. Air flow in the combustor is controlled by a compressor bleed system (not shown). The middle and outer rings (B-ring 114, A-ring 116) can include 30 premixers 122, 124, while the inner ring (C-ring 112) can include 15 premixers 120. Pressurized fuel from a fuel delivery system 129 enters the combustor at ports 130, 132, 134 and is injected through holes in each premixer 120, 122, 124, where the air and fuel mix for combustion. After the air/fuel mixture is burned, high-pressure combustion gases exit via turbine nozzle 136.

Controller 111 provides control signals to the fuel delivery system 129 for controlling premixers 120, 122, and 124 within each ring (C-ring 112, B-ring 114, A-ring 116). The premixers 120, 122, and 124 are switched on and off for various burner operating modes, such as ignition, idle speed, and changing load levels. For example, the combustor 110 is brought to idle speed by fueling the premixers 122 in the middle ring (B-ring 114). As load is increased, premixers 120 in the inner ring (C-ring 112) are also fueled. On further addition of load, the outer ring (A-ring 116) is lit while the inner ring (C-ring 112) is switched off. For highest loads, premixers 120, 122, 124 in all rings (C-ring 112, B-ring 114, A-ring 116) are fueled. Operational data can be stored as one or more control schedules 180 in a memory device 182 for use by the combustor's controller 111. The mapping device 113 can determine the appropriate one or more control schedules 180 for the combustor 110 by performing a mapping process on the combustor 110. The mapping device 113 can be arranged to receive data signals from pressure, temperature, acoustic, and emissions sensors 184, 186, 187, 188, 190, 192 within the combustor 110.

Figure 2:
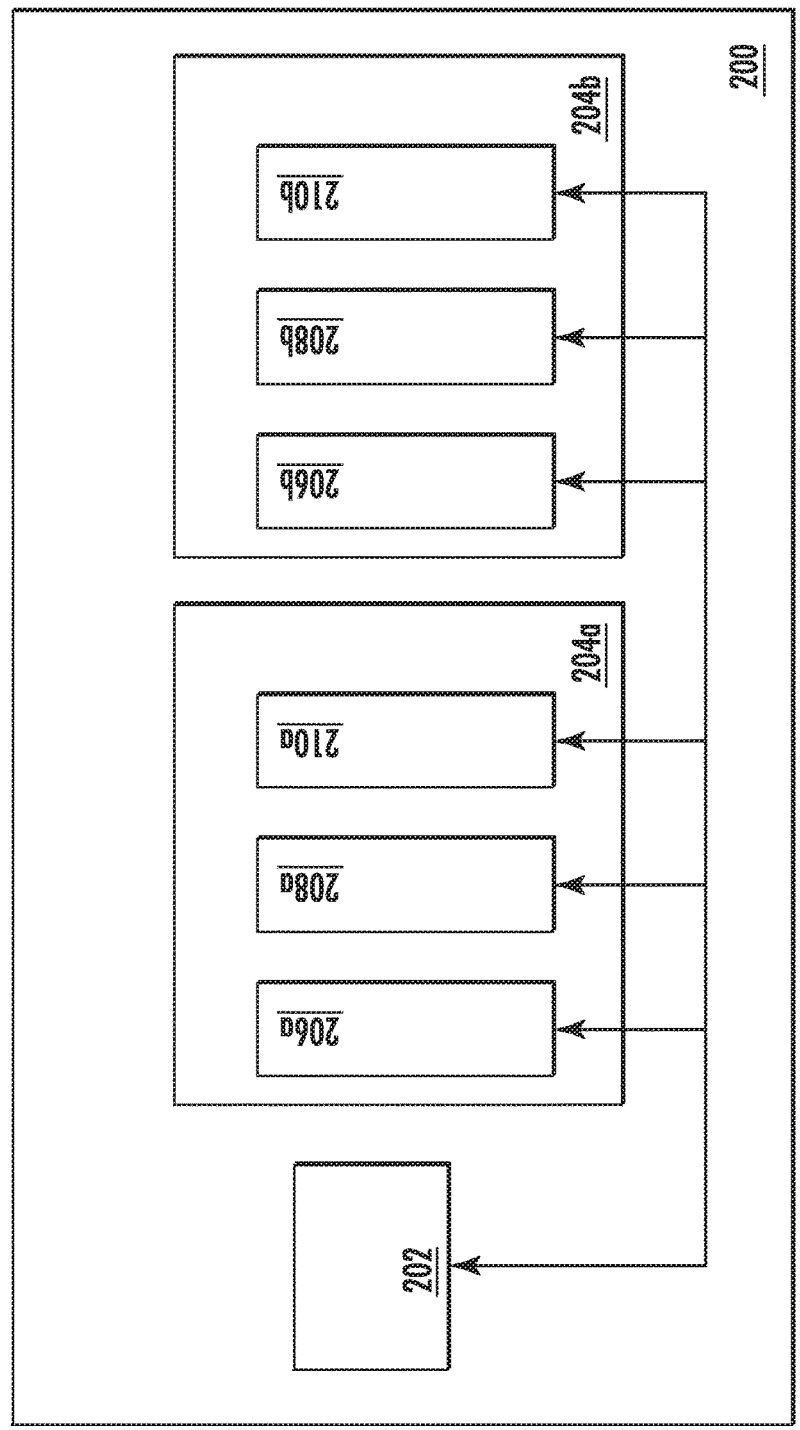
FIG. 2 depicts an example power plant according to example embodiments of the present disclosure.

FIG. 2 depicts a power plant 200 in accordance with an embodiment of the present disclosure. The power plant 200 can include a controller 202 and one or more engines 204a, 204b. The one or more engines 204a, 204b can include an A-ring 206a, 206b, a B-ring 208a, 208b, and a C-ring 210a, 210b. The controller 202 can be in communication with the one or more engines 204a, 204b. For example, the controller 202 can control the fuel split (or the fuel amount provided to the A-ring 206a, 206b, the fuel amount provided to the B-ring 208a, 208b, and the fuel amount provided to the C-ring 210a, 210b) of the one or more engines 204a, 204b. As another example, the controller 202 can receive data from the one or more engines 204a, 204b. Data received from the one or more engines 204a, 204b can include flame temperature data (include flame temperature data for the A-ring 206a, 206b, the B-ring 208a, 208b, and/or the C-ring 210a, 210b), pressure inside a combustor of the engine, emissions data, acoustics data, etc.

The controller 202 can use a plurality of models to model various outputs for a fuel split. For example, the controller 202 can model a $NO_x$ output for a fuel split, a CO output for a fuel split, an acoustic output for a fuel split, etc. The controller 202 can compare various model outputs with corresponding ranges. The controller 202 can use the data received from the one or more engines 204a, 204b to update one or more models. For example, the controller 202 can update the plurality of models for a particular engine 204a based on the data received from the particular engine 204a.

The numbers, locations, and/or orientations of the components of example power plant 200 are for purposes of illustration and discussion and are not intended to be limiting. Those of ordinary skill in the art, using the disclosures provided herein, shall understand that the numbers, locations, and/or orientations of the components of the power plant 200 can be adjusted without deviating from the scope of the present disclosure.

Figure 3:
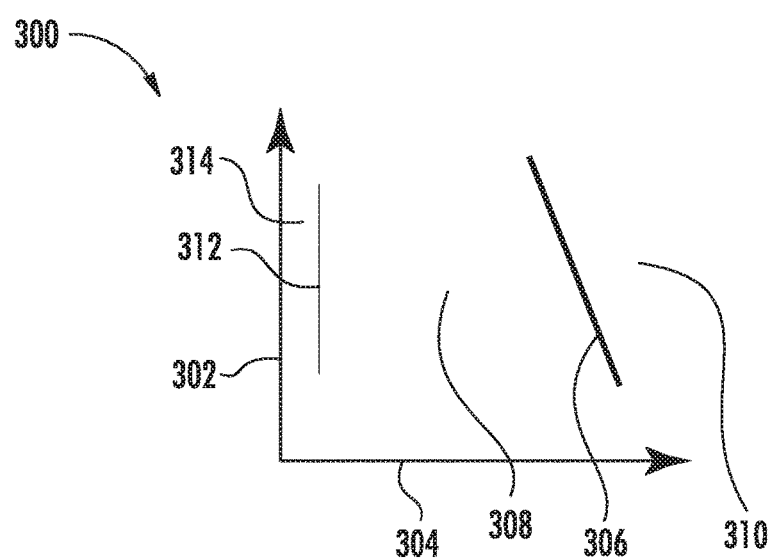
FIG. 3 is an example model in accordance with one embodiment of the present disclosure.

FIG. 3 is an example model 300 in accordance with one embodiment of the present disclosure. The model 300 models acoustic output for combinations of flame temperatures of the C-ring (TfC), represented by the vertical axis 302, and flame temperatures of the A-ring (TfA), represented by the horizontal axis 304. The flame temperature of the A-ring and the flame temperature of the C-ring are determined by the fuel split. The model 300 can determine a limiting boundary 306. In an embodiment, the model 300 can determine more than one limiting boundary. The limiting boundary 306 can be a line (or other shape) representing combinations of flame temperatures of the A-ring and flame temperatures of the C-ring. The limiting boundary 306 of the model 300 can represent a range beyond which the acoustic output will be unacceptable. Area 308 of the model 300 represents combinations of flame temperatures of the A-ring and flame temperatures of the C-ring that yield an acceptable acoustic output as determined by the model 300. Area 310 of the model 300 represents combinations of flame temperatures of the A-ring and flame temperatures of the C-ring that yield an unacceptable acoustic output as determined by the model 300. Certain combinations of TfC and TfA can be known to be a boundary for inappropriate combinations for any number of reasons, even before the model 300 is produced. Such inappropriate combinations can be represented in the model 300 by, for example, line 312. Values on and/or beyond the line 312, such as values in area 314, can be ignored by the model 300.

Figure 4:
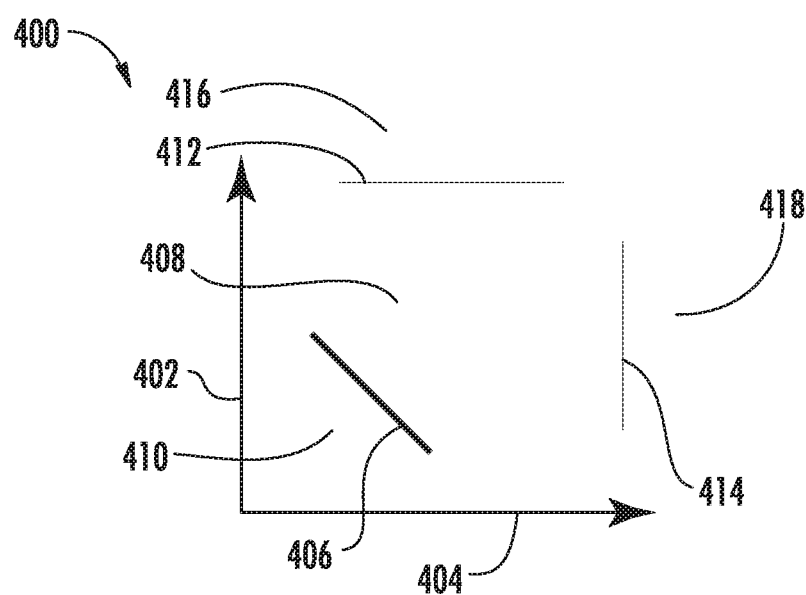
FIG. 4 is an example model in accordance with one embodiment of the present disclosure.

FIG. 4 is an example model 400 in accordance with one embodiment of the present disclosure. The model 400 models $NO_x$ output for combinations of flame temperatures of the C-ring (TfC), represented by the vertical axis 402, and flame temperatures of the A-ring (TfA), represented by the horizontal axis 404. The flame temperature of the A-ring and the flame temperature of the C-ring are determined by the fuel split. The model 400 can determine a limiting boundary 406. In an embodiment, the model 400 can determine more than one limiting boundary. The limiting boundary 406 can be a line (or other shape) representing combinations of flame temperatures of the A-ring and flame temperatures of the C-ring. The limiting boundary 406 of the model 400 can represent a range beyond which the $NO_x$ output will be unacceptable. Area 408 of the model 400 represents combinations of flame temperatures of the A-ring and flame temperatures of the C-ring that yield an acceptable $NO_x$ output as determined by the model 400. Area 410 of the model 400 represents combinations of flame temperatures of the A-ring and flame temperatures of the C-ring that yield an unacceptable $NO_x$ output as determined by the model 400. Certain combinations of TfC and TfA can be known to be a boundary for inappropriate combinations for any number of reasons, even before the model 400 is produced. Such inappropriate combinations can be represented in the model 400 by, for example, line 412 and line 414. Values on and/or beyond the line 412, such as values in area 416, can be ignored by the model 400. Similarly, values on and/or beyond the line 414, such as values in area 418, can be ignored by the model 400.

Figure 5:
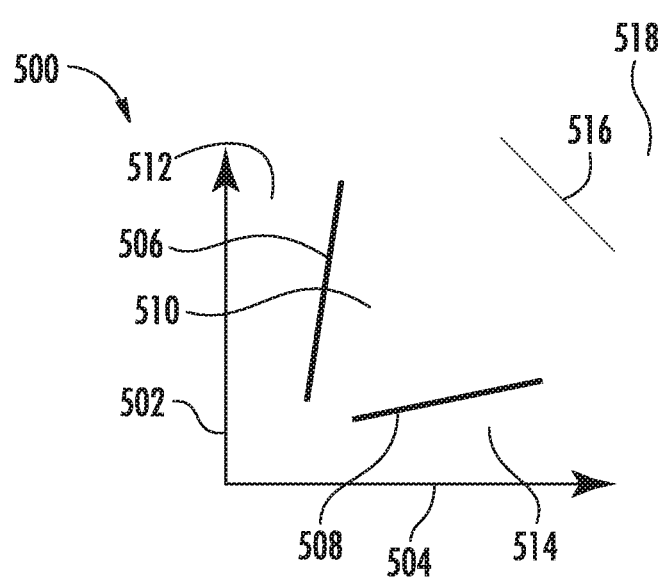
FIG. 5 is an example model in accordance with one embodiment of the present disclosure.

FIG. 5 is an example model 500 in accordance with one embodiment of the present disclosure. The model 500 models CO output for combinations of flame temperatures of the C-ring (TfC), represented by the vertical axis 502, and flame temperatures of the A-ring (TfA), represented by the horizontal axis 504. The flame temperature of the A-ring and the flame temperature of the C-ring are determined by the fuel split. The model 500 can determine a first limiting boundary 506. In an embodiment, the model 500 can determine more than one limiting boundary. For example, the model can determine a second limiting boundary 508. The first limiting boundary 506 and/or the second limiting boundary 508 can be a line (or other shape) representing combinations of flame temperatures of the A-ring and flame temperatures of the C-ring. The first limiting boundary 506 and/or the second limiting boundary 508 of the model 500 can represent a range beyond which the CO output will be unacceptable. Area 510 of the model 500 (an area on the correct side of both the first limiting boundary 506 and the second limiting boundary 508) represents combinations of flame temperatures of the A-ring and flame temperatures of the C-ring that yield an acceptable CO output as determined by the model 500. Area 512 and area 514 of the model 500 represent combinations of flame temperatures of the A-ring and flame temperatures of the C-ring that yield an unacceptable CO output as determined by the model 500. Certain combinations of TfC and TfA can be known to be a boundary for inappropriate combinations for any number of reasons, even before the model 500 is produced. Such inappropriate combinations can be represented in the model 500 by, for example, line 516. Values on and/or beyond the line 516, such as values in area 518, can be ignored by the model 500.

Figure 6:
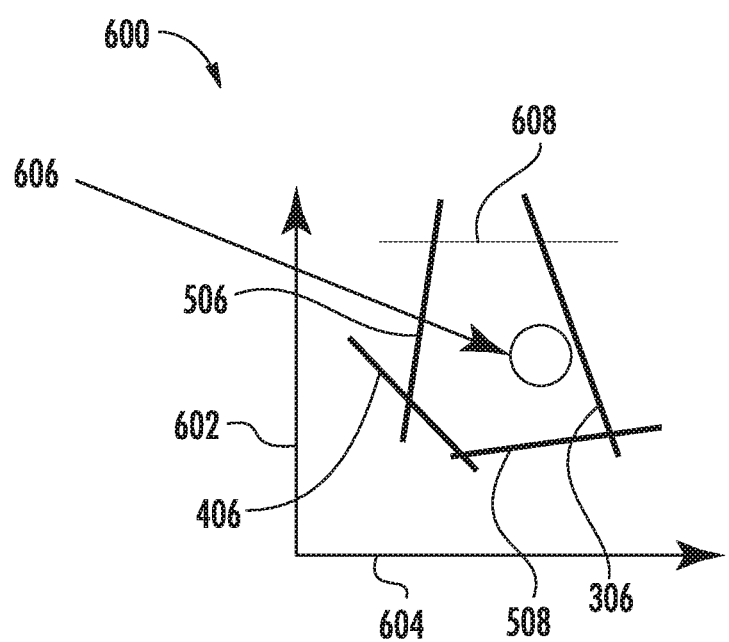
FIG. 6 is an example model in accordance with one embodiment of the present disclosure.

FIG. 6 is an example model 600 in accordance with one embodiment of the present disclosure. The model 600 models a composite of the acoustic output of FIG. 3, the $NO_x$ output of FIG. 4, and the CO output of FIG. 5 for combinations of flame temperatures of the C-ring (TfC), represented by the vertical axis 602, and A-ring (TfA), represented by the horizontal axis 604. The model 600 can include the one or more acoustic limiting boundaries of the model 300, the one or more $NO_x$ limiting boundaries of the model 400, and/or the one or more CO limiting boundaries of the model 500. For example, the model 600 can include the limiting boundary 306 of the model 300, the limiting boundary 406 of the model 400, and the first limiting boundary 506 of the model 500 and the second limiting boundary 508 of the model 500. Certain combinations of TfC and TfA can be known to be a boundary for inappropriate combinations for any number of reasons, even before the model 600 is produced. Such inappropriate combinations can be represented in the model 600 by, for example, line 608. The flame temperature of the A-ring and the flame temperature of the C-ring are determined by the fuel split. Fuel splits that produce TfA and TfC combinations within the boundaries (306, 406, 506, 508, 608) of the model 600 can represent valid fuel splits. For example, the combination of TfA and TfC at spot 606 can be selected as appropriate, and as the actual fuel split, based on the boundaries (306, 406, 506, 508, 608).

Figure 7:
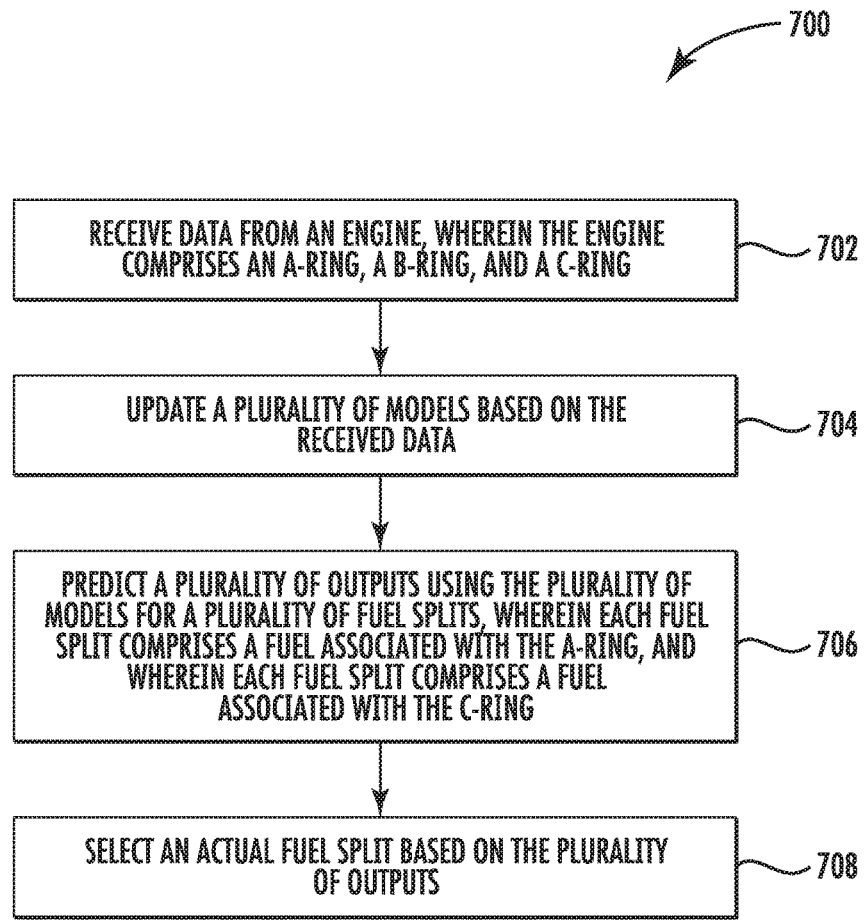
FIG. 7 depicts a flow diagram of an example method according to example embodiments of the present disclosure.

FIG. 7 depicts a flow diagram of an example method (700) for regulating fuel at a power plant. The method of FIG. 7 can be implemented using, for instance, the controller 800 of FIG. 8. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (702), data can be received from an engine. For instance, the controller 800 can receive data from an engine. The engine can include an A-ring, a B-ring, and a C-ring. The data received from the engine can include one or more of flame temperature data, pressure inside a combustor, emissions data, and acoustics data. The flame temperature data can include one or more of flame temperature in the A-ring, flame temperature in the B-ring, and flame temperature in the C-ring.

At (704), a plurality of models can be updated based on the received data. For instance, the controller 800 can update a plurality of models based on the received data. At least one of the plurality of models can predict a $NO_x$ output. At least one of the plurality of models can predict a CO output. At least one of the plurality of models can predict an acoustic output. In one embodiment, at least one of the plurality of models can predict a $NO_x$ output, at least one of the plurality of models can predict a CO output, and at least one of the plurality of models can predict an acoustic output.

At (706), predicting a plurality of outputs using the plurality of models for a plurality of fuel splits. For instance, the controller 800 can predict a plurality of outputs using the plurality of models for a plurality of fuel splits. Each fuel split can include a fuel amount associated with the A-ring. Each fuel split can include a fuel amount associated with the C-ring.

At (708), an actual fuel split can be selected based on the plurality of outputs. For instance, the controller 800 can select an actual fuel split based on the plurality of outputs. When at least one of the plurality of models predicts an acoustic output, selecting an actual fuel split based on the plurality of outputs can include identifying each of the fuel splits for which the at least one of the plurality of models predicts an acoustic output above a threshold. The threshold can be a value, a line, an arc, etc. beyond which the acoustic output is inappropriate (e.g., invalid, unsafe, undesirable, etc.). When at least one of the plurality of models predicts an acoustic output, selecting an actual fuel split based on the plurality of outputs can include eliminating each of the identified fuel splits as the actual fuel split.

When at least one of the plurality of models predicts a $NO_x$ output, at least one of the plurality of models predicts a CO output, and at least one of the plurality of models predicts an acoustic output, selecting an actual fuel split based on the plurality of outputs can include identifying each of the fuel splits for which at least one of the plurality of models predicts a $NO_x$ output outside of a first range. The first range can be a range in which $NO_x$ values are appropriate (e.g., valid, safe, desirable, etc.). When at least one of the plurality of models predicts a $NO_x$ output, at least one of the plurality of models predicts a CO output, and at least one of the plurality of models predicts an acoustic output, selecting an actual fuel split based on the plurality of outputs can include identifying each of the fuel splits for which at least one of the plurality of models predicts a CO output outside of a second range. The second range can be a range in which CO values are appropriate (e.g., valid, safe, desirable, etc.). When at least one of the plurality of models predicts a $NO_x$ output, at least one of the plurality of models predicts a CO output, and at least one of the plurality of models predicts an acoustic output, selecting an actual fuel split based on the plurality of outputs can include identifying each of the fuel splits for which at least one of the plurality of models predicts an acoustic output above a threshold. The threshold can be a value, a line, an arc, etc. beyond which the acoustic output is inappropriate (e.g., invalid, unsafe, undesirable, etc.). When at least one of the plurality of models predicts a $NO_x$ output, at least one of the plurality of models predicts a CO output, and at least one of the plurality of models predicts an acoustic output, selecting an actual fuel split based on the plurality of outputs can include eliminating each of the identified fuel splits as the actual fuel split. Optionally, data can be received from a variable enhanced lean blow out (ELBO) fuel circuit. For instance, the controller 800 can receive data from a variable ELBO fuel circuit.

Figure 8:
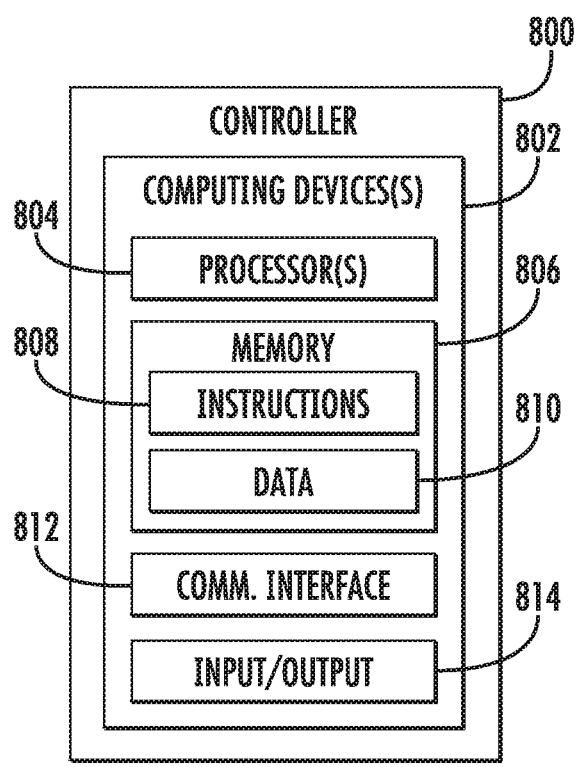
FIG. 8 depicts a computing system for implementing one or more aspects according to example embodiments of the present disclosure.

FIG. 8 depicts a block diagram of an example computing system that can be used to implement the control system 800 or other systems of the power plant according to example embodiments of the present disclosure. As shown, the control system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 808 can be executed by the one or more processor(s) 804 to cause the one or more processor(s) 804 to perform operations, such as the operations for regulating fuel at a power plant, as described with reference to FIG. 7.

The memory device(s) 806 can further store data 810 that can be accessed by the processors 804. For example, the data 810 can include data from the one or more engines 204a, 204b as described herein. As another example, the data 810 can include data needed to create models 300, 400, 500, and/or 600 as described herein. The data 810 can include one or more table(s), function(s), algorithm(s), model(s), equation(s), etc. for regulating fuel at a power plant 200 according to example embodiments of the present disclosure.

The one or more computing device(s) 802 can also include a communication interface 812 used to communicate, for example, with the other components of system. The communication interface 812 can include any suitable components for interfacing with one or more network(s), including for example, transmitters, receivers, ports, controllers, antennas, or other suitable components.

The one or more computing device(s) 802 can include input and/or output devices 814. For example, the input and/or output device(s) 814 can include a keyboard, joystick, multi-way rocker switches, mouse, trackball, touch screen, touch pad, data entry keys, a microphone suitable for voice recognition, a display device and/or any other suitable device.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for regulating fuel at a power plant comprising:
  receiving data from an engine, wherein the engine comprises an A-ring, a B-ring, and a C-ring;
  updating a composite model based on the received data, wherein the composite model models a composite of a plurality of outputs for combinations of flame temperatures at the C-ring and the A-ring, the plurality of outputs of the engine including an acoustic output, a $NO_x$ output, and a CO output;
  predicting the plurality of outputs including the acoustic output, the $NO_x$ output, and the CO output using the updated composite model for a plurality of fuel splits, wherein each fuel split comprises a fuel amount associated with the A-ring, and wherein each fuel split comprises a fuel amount associated with the C-ring; and
  selecting an actual fuel split based on the plurality of outputs.

2. The method of claim 1, wherein selecting an actual fuel split based on the plurality of outputs further comprises:
  identifying each of the fuel splits for which the composite model predicts the acoustic output above a threshold; and
  eliminating each of the identified fuel splits as the actual fuel split.

3. The method of claim 1, wherein selecting the actual fuel split based on the plurality of outputs further comprises:
  identifying each of the fuel splits for which the composite model predicts the $NO_x$ output outside of a first range;
  identifying each of the fuel splits for which the composite model predicts the CO output outside of a second range;

identifying each of the fuel splits for which the composite model predicts the acoustic output above a threshold; and
eliminating each of the identified fuel splits as the actual fuel split.

4. The method of claim 1, wherein the data received from the engine comprises one or more of flame temperature data, pressure inside a combustor, emissions data, and acoustics data.

5. The method of claim 4, wherein the flame temperature data comprises one or more of flame temperature in the A-ring and flame temperature in the C-ring.

6. The method of claim 1, further comprises receiving data from a variable enhanced lean blow out (ELBO) fuel circuit.

7. A system for regulating fuel at a power plant comprising:
an engine comprising:
an A-ring;
a B-ring; and
a C-ring; and
a controller, wherein the controller is configured to:
receive data from the engine;
update a composite model based on the received data, wherein the composite model models a composite of a plurality of outputs for combinations of flame temperatures at the C-ring and the A-ring, the plurality of outputs of the engine including an acoustic output, a $NO_x$ output, and a CO output;
predict the plurality of outputs including the acoustic output, the $NO_x$ output, and the CO output using the updated composite model for a plurality of fuel splits, wherein each fuel split comprises a fuel amount associated with the A-ring, and wherein each fuel split comprises a fuel amount associated with the C-ring; and
select an actual fuel split for the engine based on the plurality of outputs.

8. The system of claim 7, wherein the controller is further configured to:
identify each of the fuel splits for which the composite model predicts the acoustic output above a threshold; and
eliminate each of the identified fuel splits as the actual fuel split.

9. The system of claim 7, wherein the controller is further configured to:
identify each of the fuel splits for which the composite model predicts the $NO_x$ output outside of a first range;
identify each of the fuel splits for which the composite model predicts the CO output outside of a second range;
identify each of the fuel splits for which the composite model predicts the acoustic output above a threshold; and
eliminate each of the identified fuel splits as the actual fuel split.

10. A power plant comprising:
an engine comprising:
an A-ring;
a B-ring; and
a C-ring; and
a controller, wherein the controller is configured to:
receive data from the engine;
update a composite model based on the received data, wherein the composite model models a composite of a plurality of outputs for combinations of flame temperatures at the C-ring and the A-ring, the plurality of outputs of the engine including an acoustic output, a $NO_x$ output, and a CO output;
predict the plurality of outputs including the acoustic output, the $NO_x$ output, and the CO output using the updated composite model for a plurality of fuel splits, wherein each fuel split comprises a fuel amount associated with the A-ring, and wherein each fuel split comprises a fuel amount associated with the C-ring; and
select an actual fuel split for the engine based on the plurality of outputs.

11. The method of claim 3, wherein the composite model defines a plurality of limiting boundaries each representing combinations of flame temperatures of the A-ring and the C-ring, the plurality of limiting boundaries including a limiting boundary associated with the $NO_x$ output and defining the first range, a limiting boundary associated with the CO output and defining the second range, and a limiting boundary associated with the acoustic output and defining the threshold.

12. The method of claim 11, wherein one or more of the plurality of limiting boundaries are defined as a linear function.

13. The method of claim 1, wherein the composite model defines a plurality of ignore boundaries each representing inappropriate combinations of flame temperatures of the A-ring and the C-ring, wherein any output of the plurality of outputs beyond one of the plurality of ignore boundaries is ignored by the composite model.

14. The method of claim 13, wherein the plurality of ignore boundaries includes an ignore boundary associated with the $NO_x$ output and defines a first ignore range, a ignore boundary associated with the CO output and defines a second ignore range, and an ignore boundary associated with the acoustic output and defining a third ignore range.

15. The system of claim 7, wherein the controller is further configured to receive data from a variable enhanced lean blow out (ELBO) fuel circuit of the engine.

16. The system of claim 8, wherein the threshold is defined by the composite model as an arc.

17. The powerplant of claim 10, wherein the composite model defines a plurality of limiting boundaries each representing combinations of flame temperatures of the A-ring and the C-ring, the plurality of limiting boundaries including a limiting boundary associated with the $NO_x$ output and defining the first range, a limiting boundary associated with the CO output and defining the second range, and a limiting boundary associated with the acoustic output and defining the threshold.

18. The powerplant of claim 10, wherein the composite model defines a plurality of ignore boundaries each representing inappropriate combinations of flame temperatures of the A-ring and the C-ring, wherein any output of the plurality of outputs beyond one of the plurality of ignore boundaries is ignored by the composite model.

19. The powerplant of claim 18, wherein the plurality of ignore boundaries includes an ignore boundary associated with the $NO_x$ output and defines a first ignore range, a ignore boundary associated with the CO output and defines a second ignore range, and an ignore boundary associated with the acoustic output and defining a third ignore range.

* * * * *